March 15, 1932. B. E. MEURK ET AL 1,849,196
APPARATUS FOR SEPARATING AIR FROM WATER
Filed June 27, 1930    3 Sheets-Sheet 1
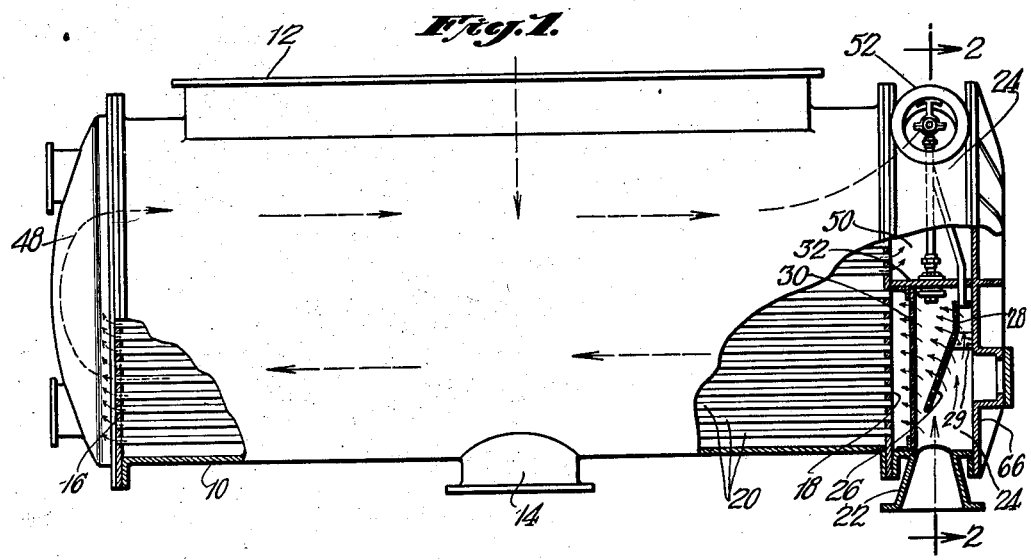
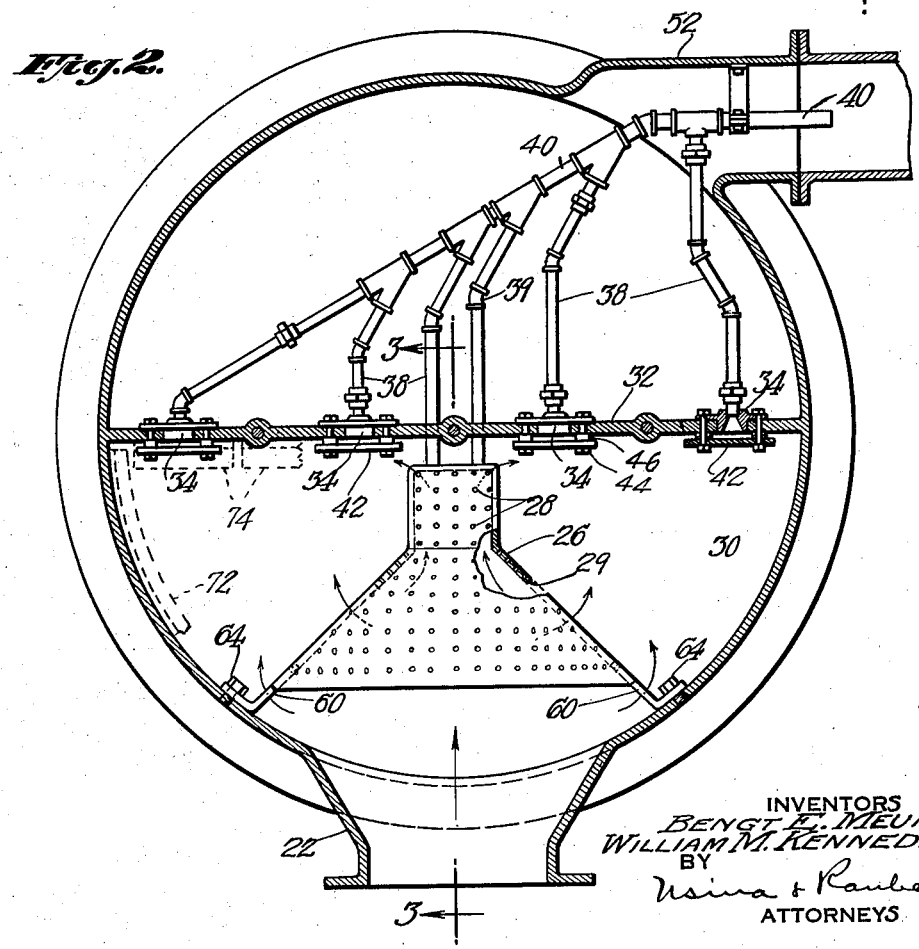
INVENTORS
BENGT E. MEURK
WILLIAM M. KENNEDY, Jr.
BY
ATTORNEYS

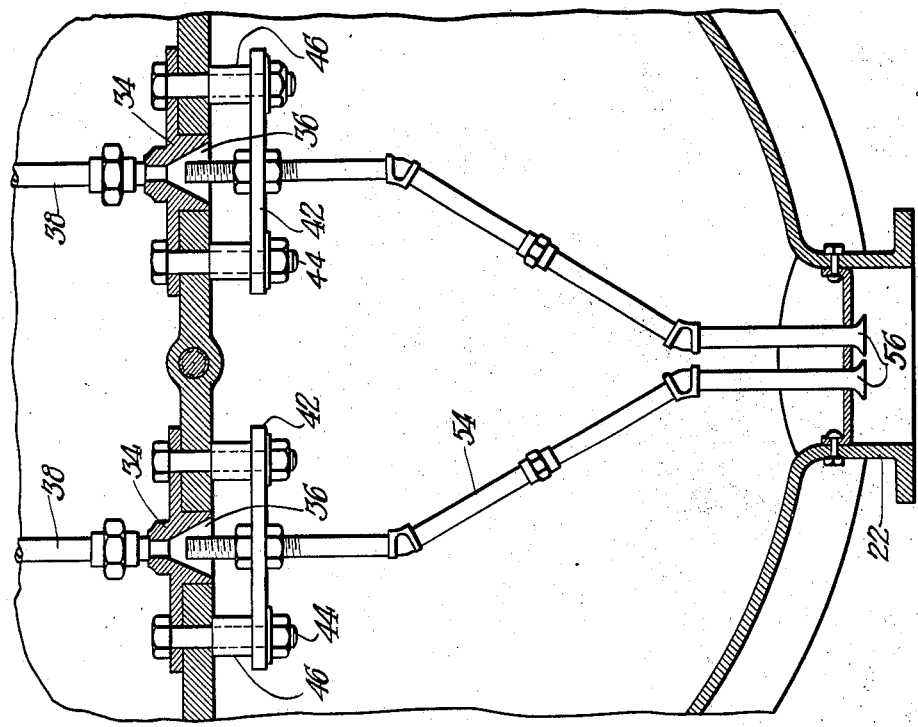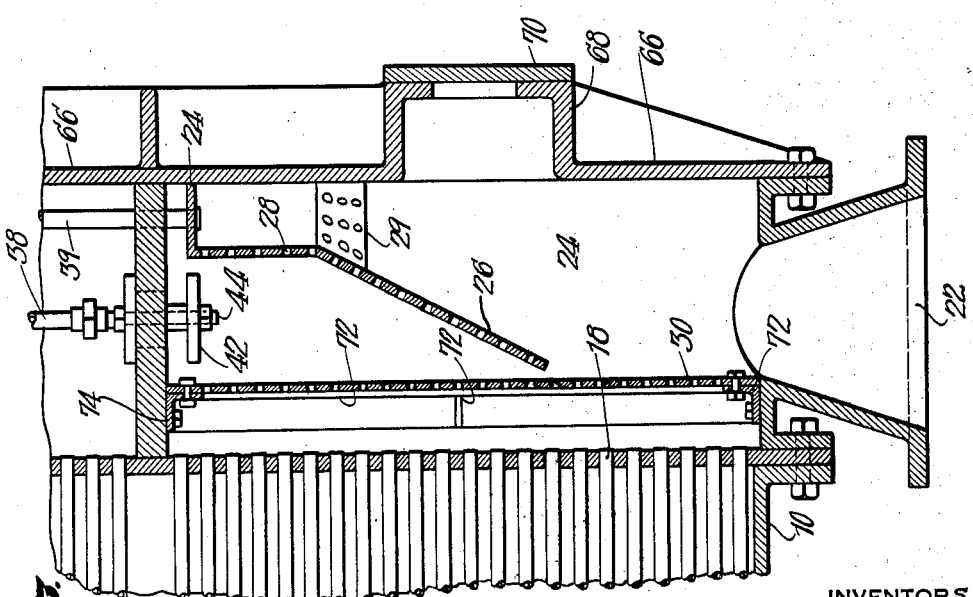

March 15, 1932. B. E. MEURK ET AL 1,849,196
APPARATUS FOR SEPARATING AIR FROM WATER
Filed June 27, 1930   3 Sheets-Sheet 3

INVENTORS
BENGT E. MEURK.
WILLIAM M. KENNEDY, JR.
BY
ATTORNEYS

Patented Mar. 15, 1932

1,849,196

UNITED STATES PATENT OFFICE

BENGT E. MEURK, OF UPPER MONTCLAIR, AND WILLIAM M. KENNEDY, JR., OF LYNDHURST, NEW JERSEY

APPARATUS FOR SEPARATING AIR FROM WATER

Application filed June 27, 1930. Serial No. 464,308.

This invention relates to means for separating air and oxygen from cooling water in connection with heat exchange apparatus such as condensers and the like.

The circulating water commonly used as a medium for extracting heat from exhaust steam in condensers or other cooling apparatus is frequently charged with free air to a great extent. The invention aims to provide means whereby such air can be liberated or extracted from the water. By such extraction of the air greater efficiency of heat transfer is secured and the useful life of tubes, tube sheets and other metallic parts of the condenser is lengthened. By liberating the air from the water, free oxygen is extracted therefrom which would otherwise cause serious erosion of the material. Such erosion due to the action of oxygen contained in water causes tube failure and a weakening of other parts of water handling apparatus heretofore in use. Our invention aims to provide means for overcoming this erosive action by the provision of means which liberate the air from the water.

The invention will be fully apparent when read in connection with the accompanying drawings and will be defined with particularity in the appended claims.

In the drawings:—

Fig. 1 illustrates a condenser embodying the invention;

Fig. 2 is an enlarged transverse sectional view on line 2—2 of Fig. 1;

Fig. 3 is a section on line 3—3 of Fig. 2;

Fig. 4 is a detail view illustrating means for accelerating the expulsion of air from the apparatus;

Figure 5:
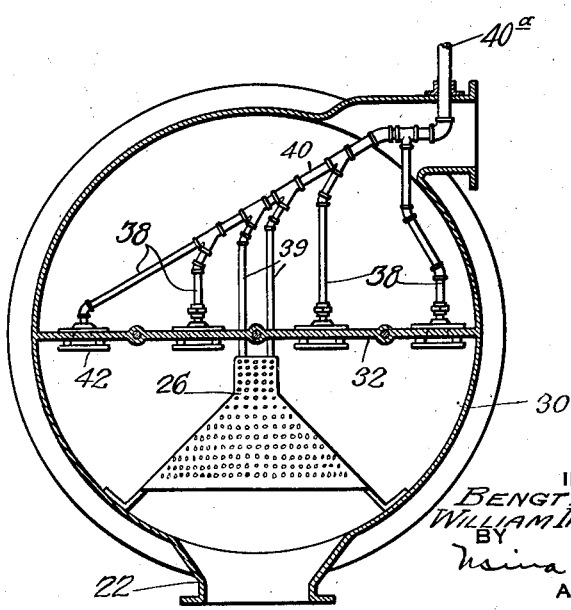
Fig. 5 is a sectional view illustrating a modification.

Referring in detail to the drawings, 10 represents a shell of a condenser which is provided with a usual steam inlet 12 and an outlet 14 for the water of condensation. The condenser includes tube sheets 16 and 18 to which are secured a multiplicity of tubes 20.

The cooling water from which the air is to be extracted flows through the tubes 20 and the steam to be condensed flows around the tubes in the usual manner.

The cooling or circulating water is forced by means of a suitable pump not shown through the inlet fitting 22 of a water box 24 secured to the right side of a condenser. As the entering water flows upwardly it strikes a flared baffle member 26, the upper portion of which is perforated as indicated at 28. This baffle member is also cut away as indicated at 29. This arrangement compels the water to break up, turn and twist and flow through orifices of different sizes. In this way, air or air bubbles entrained in the water are liberated, the air being lighter than the water tends to rise. Before the circulating water enters the tubes 20 it passes through perforations in a foraminous diaphragm 30 which is secured within the water box a short distance from the tube sheet 18. This results in further breaking up of the water causing it to flow in a multiplicity of separate streams toward the tubes 20 In this way, the entrained air is further liberated. The air thus liberated by the diaphragm 30 and baffle member referred to rises or bubbles up to the underside of a division plate 32 which divides the water box in two parts. This division plate carries a number of nozzles 34 having flaring orifices 36 which communicate with pipes 38 which are adapted to carry off the liberated air. There are several of the nozzles 34 and pipes 38, and as indicated in Fig. 2, all of the pipes communicate with a common outlet pipe 40. Spaced a short distance below the orifice of each outlet nozzle 34, there is a baffle plate 42 which is secured by bolts 44 having spacers 46 surrounding their lower portions. Any air pocketed at the top of the baffle member 26 escapes through the pipes 39.

In the embodiment of the invention illustrated in Figs. 1 to 4 inclusive the circulating or cooling water enters at the fitting 22 and flows upward and in an irregular or zigzag path and is broken up and separated into many separate streams, thus liberating the air which is carried away by the pipes 38, 39. The water flows through the multiplicity of pipes 20 to a header 48 secured to the condenser adjacent the tube sheet 16. From this header, the water flows in the reverse direction through the upper half of the condenser to the chamber 50 of the water box and thence to the water outlet fitting 52. The air discharge pipe 40 is located within and discharges into the pipe 52, thus the outgoing water creates a suction to accelerate the outflow of air through the several pipes 38 and 39.

In some installations, it is advisable to provide additional means for accelerating the outflow of the liberated air. Such an arrangement is illustrated in Fig. 4 wherein pipes 54 are provided having funnel-shaped extremities 56. These are disposed within the water inlet fitting 22. The inrushing water flows through pipes 54 and is discharged at the extremities of such pipes at 58 within the flared orifices 36. This creates a slight vacuum which tends to accelerate the passage of liberated air out through the pipes 38 with the water from pipe 54 out through pipe 40. The pipe 40 discharges into the water flowing from pipe 52, as shown. In other forms, no special form of apparatus is necessary to accelerate the outflow of air other than the erection of a simple pipe or pipes of sufficient height to overcome the effect of static pressure. Such an arrangement would be very similar to Fig. 2 except that the pipe 40 would merely be in the form of a vertical standpipe of considerable height as indicated at 40ª in Fig. 5.

The baffle member 28 shown in Fig. 2 consists preferably of a separate member having legs 60 which are secured to the wall of the water box 24 by suitable bolts 64 as shown. The water box is closed at the end by a removable head 66 having a man-hole chamber 68 formed therein which is closed by suitable cover plate 70.

The perforated or foraminous diaphragm 30 is secured to the water box by means of a number of curved angle bars 72. At the top similar straight angle bars 74 are utilized as connection members. These bars being separated so as to leave spaces for the escape of air along the upper surface of the division plate 32. Thus any air liberated between the diaphragm 30 and the tube sheet 18 will find its way to the outlet orifices 36.

While we have shown a specific baffling arrangement it is to be understood that the baffles may be constructed in various ways to suit the particular conditions surrounding each distinct installation. The function of the baffles is to break up and cause the air to be released or liberated from the water and to accumulate in parts of the apparatus where it can be drawn off or expelled before the water circulates through the multiplicity of condenser tubes. The baffle plates being made of soft steel or similar ferrous metal of greater positive electric potentiality than the tubes will serve also as erosion plates so that the free oxygen of the water will concentrate its effect on the plates and thus be absorbed and protect the condenser tubes and tube sheets. When the plate 30 and the flared baffle member 26 become eroded they can be readily removed for cleaning, replacement or repair without disturbing the tube sheet or tubes merely by removing the detachable head 66.

Various modifications may be made by those skilled in the art without departing from the invention as defined in the appended claims.

What we claim is:

1. In a condenser having a multiplicity of tubes through which water flows, a foraminous diaphragm which intercepts the flow of water to said tubes so as to liberate air entrained with the water before the water enters the tubes and means for carrying away the liberated air.

2. A condenser including a casing, a tube sheet and a multiplicity of tubes secured thereto, a water box secured adjacent the tube sheet, means for breaking up the flow of water from the water box to the tubes to liberate air from the water before the water enters the tubes and ducts communicating with water box for carrying away the liberated air.

3. A condenser including a casing, a tube sheet and a multiplicity of tubes secured thereto, a water box secured adjacent the tube sheet, means for breaking up the flow of water from the water box to the tubes to liberate air from the water, ducts communicating with the water box for carrying away the liberated air and means for accelerating the flow of air through said ducts.

4. In a condenser having a multiplicity of tubes through which water flows, means for separating entrained air from the water before the latter enters the tubes and means for accelerating the outflow of liberated air.

5. In combination with a condenser comprising a casing having a plurality of passages through which water is adapted to flow, a box enclosing baffling means adapted to liberate the air entrained with the water before the water enters said passages and a duct communicating with said box for carrying off the liberated air.

6. A condenser including a casing, a tube sheet and a multiplicity of tubes secured thereto, a water box secured adjacent the tube sheet, a perforated plate substantially parallel to the tube sheet enclosed by the water box and spaced from the tube sheet, said water box having a water inlet located on the side of said perforated plate remote from the tube sheet so that the water before flowing to said tubes is compelled to pass through said perforated plate, and means for carrying away the air liberated in the water box.

7. A condenser including a casing, a tube sheet and a multiplicity of tubes secured thereto, a water box having a division plate dividing it into upper and lower chambers, a perforated plate in the lower chamber and spaced from the tube sheet, a water inlet communicating with said lower chamber, a water outlet communicating with said upper chamber, and an air outlet for carrying away the liberated air.

8. A condenser including a casing, a tube sheet and a multiplicity of tubes secured thereto, a water box removably secured adjacent said tubes, a perforated member intercepting the flow of water to said tubes and liberating air, said member being of a material having a greater positive electrical potentiality than the material of the tubes and a duct for carrying away the liberated air.

9. A condenser including a casing, a tube sheet and a multiplicity of tubes secured thereto, a water box removably secured adjacent said tubes, a perforated member intercepting the flow of water to said tubes and liberating air, said member absorbing oxygen and a duct for carrying away the liberated air.

In witness whereof, we have hereunto signed our names.

BENGT E. MEURK.
WILLIAM M. KENNEDY, JR.